Feb. 12, 1935.   R. P. LA PORTE   1,990,738
COLD HOLDER AND METHOD OF MAKING THE SAME
Filed June 18, 1932
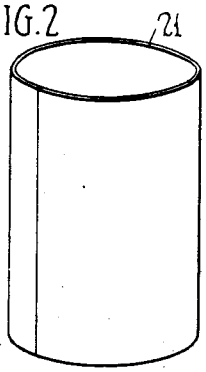
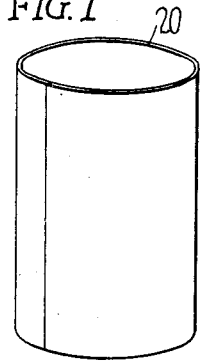
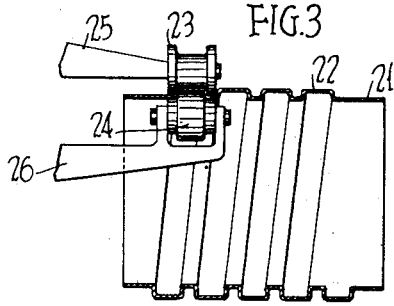
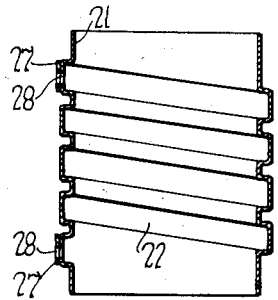
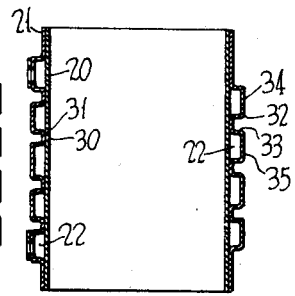
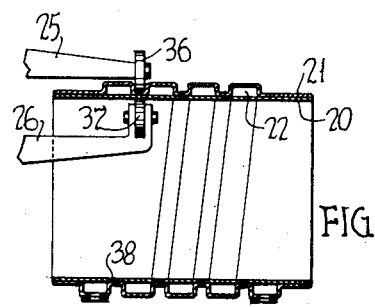
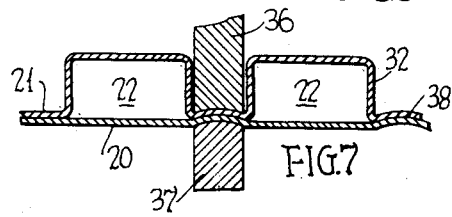
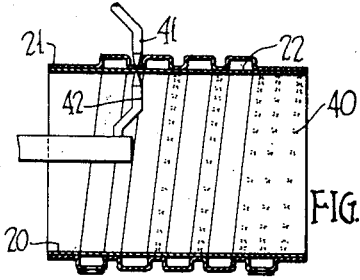
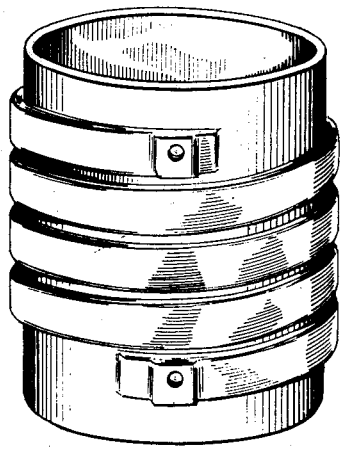
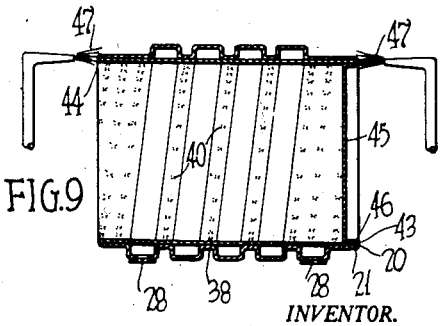
INVENTOR.
RALPH P. LA PORTE
BY
*John P. Tarbox*
ATTORNEY.

Patented Feb. 12, 1935

1,990,738

UNITED STATES PATENT OFFICE 1,990,738

COLD HOLDER AND METHOD OF MAKING THE SAME

Ralph P. La Porte, Philadelphia, Pa., assignor to Edward G. Budd Manufacturing Company, Philadelphia, Pa., a corporation of Pennsylvania Application June 18, 1932, Serial No. 618,033

10 Claims. (Cl. 29—157.3)

My invention relates to devices arranged for the transfer of heat between mediums conveyed therein and thereabout and has for its principal object the production of a device of this class and the development of a method whereby such devices may be made with good seams throughout by relatively inexpensive processes.

I attain the above objects and others incidental thereto by rolling the portions of two substantially tubular sheet metal members of conforming cross section between adjacent sections of consecutive parts of a passage in one or both of said members and thereafter welding along the said partially deformed portion.

My invention is especially susceptible to the following method wherein two tubular members of conforming cross section, adapted for nested relation, one of which contains a helical passage are placed in coaxial condition and the portions between the adjacent sections of the passage are partially deformed into good surface contact and then welded along this area.

My invention will be better understood from the following description when considered in connection with the accompanying drawing.

In the accompanying drawing,

Figures 1 and 2 each show in perspective a sheet metal cylinder adapted for co-axial nesting, Figure 3 shows the cylinder in cross section with the passage forming rolls positioned with respect to it, Fig. 4 shows a cylinder in cross section with the ports at the opposite ends of the passage.

Fig. 5 shows in cross section the cylinders in nested relation,

Fig. 6 shows the nested cylinders being rolled along the portions intermediate adjacent sections of parts of consecutive turns of the fluid passage, Fig. 7 shows an enlarged view of the operation shown in Fig. 6, Fig. 8 shows the spot welding of the seams, Fig. 9 shows a sealing of the ends of the container, and Fig. 10 shows in perspective a completed receptacle made in accordance with the teachings of my invention.

The cylinders 20 and 21 of Figs. 1 and 2 respectively may be formed in any well-known fashion although it is readily apparent that they may be made from flat strips which have been rolled to cylinder formation and then homogeneously united upon their opposed edges. It is, however, to be understood that the cylinders may be formed by any of a number of well known methods. These cylinders are of such diameter that they are adapted for co-axial telescoping relation.

In Fig. 3 the cylinder 21 is being formed with a helical passage 22 for the conveyance of refrigerant or other medium by rolling the passage outwardly between two opposed cooperating rolls 23 and 24 mounted upon arms 25 and 26. These arms, although it is not shown, are adapted for separation so that the cylindrical member 21 may be removed from between them after the operation of the rolling of the passages has been completed. Although I have shown this passage as formed radially outwardly of the cylinder it is just as obvious that this passage might have been formed upon the cylinder 20 by forming the metal radially inwardly. Also, the passage might be partially in each tubular member. However, inasmuch as the radial inward operation entails a decreased diameter of the parts the operation requires more power and stronger mechanism than is necessary wherein the parts are formed outwardly increasing the diameter. It is because of this ease of operation that I prefer to roll the part as described.

After the completion of the passage forming operation as shown in Fig. 3, the opposite extremities of the fluid conveying passages are drilled and tapped or ported in some suitable manner as at 28 and reinforced by superposed plates 27, for example, and thereby adapted to receive the ends of a fluid conveying conduit which is to be connected to the cold holder or evaporator. This tapping operation is not absolutely essential to be performed at this particular stage of the construction but may be delayed until the parts have been completely formed at which time it may be completed.

Fig. 5 shows the two cylinders 20 and 21 nested in co-axial relation so that the passage formed in the cylinder 21 is completed by the cylinder 20 at the open side so that a continuous helical passage is formed between the two members. The next step which is vitally important to my method consists in the partial deforming by opposed rolls, as shown in Figs. 6 and 7 of the substantially flat cooperating portions 30 and 31 of the two cylinders between the walls 32 and 33 of adjacent sections of corresponding portions of consecutive turns 34 and 35 of the helix. This operation is performed by passing the nested cylinders between co-acting concave and convex die rolls 36 and 37 which are again mounted for opposed cooperation similarly to the rolls of Fig. 3. This operation is more readily seen in Fig. 7 wherein the parts are broken away and enlarged. The convex and concave cooperating surfaces of the two rolls partially deform the flat helical portions between the helical passages of the container giving an outwardly indented area 38. This area is, after this operation in substantial surface contact throughout and thereby readily adapted for welding. This step is vitally essential inasmuch as spot welding of these cooperating parts must be done between good contacting surfaces otherwise incomplete or imperfect welds may result.

After the forming operation has been completed the container is welded helically from one end to another giving a helical seam composed of spot welds 40, as shown. Electrodes 41 and 42 are of any well known type adapted for this purpose commensurate with the size of the work and the usual considerations controlling the electrode design.

Although the seam formed after the deforming operation, by the consecutive spot welds makes a helical series about the work sufficient to make a fluid-tight joint throughout, it may be expedient to additionally safeguard against any possible leakage by fusing the ends of the cylinders in addition, as at 43 and 44, which may be done by an ordinary acetylene or electric arc 47. The one end of the cylinder can be closed by the insertion of a flanged disc 45 which should be inserted prior to the fusing operation so that the three metal thicknesses, cylinder 21, cylinder 20 and the flange 46 of the disc will be fused at one operation.

Modifications of the invention will be obvious to those skilled in the art and I do not therefore wish to be limited except by the scope of my appended claims as interpreted in the light of the generic spirit of my invention.

What I claim is:

1. The method of making cold holders out of a pair of metal sheets which comprises rolling said sheets to cylinder form and welding the opposed edges, rolling a helical passage in one of said cylinders, tapping ports at the extremities of said passage, positioning said cylinders in co-axial nested relation, rolling said cylinders upon the flat portions between the adjacent sections of said passage to partially deform said portions into nested contact and spot welding said area to form a fluid tight seam.

2. The method of making cold holders out of a pair of metal sheets which comprises rolling said sheets to cylinder form and welding the opposed edges, rolling a helical passage in one of said cylinders, tapping ports at the extremities of said passage, positioning said cylinders in co-axial nested relation, rolling said cylinders upon the flat portions between the adjacent sections of said passage to partially deform said portions into nested contact, spot welding said area to form a fluid tight seam, inserting a flanged disc into one end of said cylinders and sealing the annular seam at the ends of said cylinders.

3. The method of making cold holders out of a pair of metal sheets which comprises rolling said sheets to cylinder form and welding the opposed edges, rolling a helical passage in one of said cylinders, tapping ports at the extremities of said passage, positioning said cylinders in co-axial nested relation, rolling said cylinders upon the flat portions between the adjacent sections of said passage to partially deform said portions into nested contact, spot welding said area to form a fluid tight seam, inserting a flanged disc into one end of said cylinders and sealing the annular seam at the ends of said cylinders by fusion.

4. The method of forming chambers from a pair of co-axial sheet metal cylinders one of which has a passage formed therein which comprises nesting said cylinders in co-axial relation and rolling said cylinders between cooperating die rolls along the flat portions between the adjacent sections of said passage to partially deform the area into good surface contact and welding said area to form a seam.

5. The method of making an evaporator from a pair of co-axial sheet metal cylinders one of which has a passage formed therein which comprises nesting said cylinders and rolling the flattened area between adjacent portions of consecutive turns of said passage to partially deform the area into continuous surface contact, welding said deformed area and sealing the ends of said cylinder.

6. The method of making an evaporator from a pair of co-axial sheet metal cylinders one of which has a helical passage formed therein which comprises nesting said cylinders and rolling the flattened area between adjacent portions of consecutive turns of said passage between cooperating rolls to partially deform the area into continuous surface contact, and spot welding said deformed area and the end portions of said cylinder.

7. The method of making an evaporator from a pair of co-axial sheet metal cylinders one of which has a helical passage formed therein which comprises nesting said cylinders and rolling the flattened area between adjacent portions of consecutive turns of said passage between cooperating rolls to partially deform the area into continuous surface contact, and spot welding said deformed area and the end portions of said cylinder and double sealing said ends by fusion along the seam co-extensive to the ends of the cylinder.

8. The method of making a heat transfer unit from a pair of nested tubular members, one of which contained a passage formed therein which comprises deforming said members into surface contact between adjacent portions of said passage welding along said deformed area and sealing the ends of said unit.

9. The method of making a sheet metal heat transfer unit from a pair of nested substantially tubular sheet metal members of conforming cross section said members forming therebetween a helical closed passage which comprises deforming said members along a continuous path along and adjacent to said helical passage and welding said members along said deformed area whereby to provide said passage with a surrounding fluid tight joint.

10. A cold holder comprising sheet metal concentric substantially tubular members, a helical concentric passage formed between said members, interlocked deformed areas coextensive with and adjacent said passage, said members being welded along said deformed areas, and a closure member for said cold holder peripherally arc welded to one axial extremity of the tubular members.

RALPH P. LA PORTE.